United States Patent [19]

Strnad

[11] Patent Number: 4,917,325
[45] Date of Patent: Apr. 17, 1990

[54] WEBBING SENSOR

[75] Inventor: George Strnad, Windsor, Canada

[73] Assignee: Allied-Signal Inc., Morris Township, Morris County, N.J.

[21] Appl. No.: 137,962

[22] Filed: Dec. 23, 1987

[51] Int. Cl.[4] .......................................... B60R 22/38
[52] U.S. Cl. ............................................ 242/107.4 B
[58] Field of Search ................ 242/107.4 B, 107.4 A; 280/806; 297/478

[56] References Cited

U.S. PATENT DOCUMENTS

| | | | |
|---|---|---|---|
| 3,851,835 | 12/1974 | Fohl | 242/107.4 B |
| 3,980,247 | 9/1976 | Kuszyncki et al. | 242/107.4 B |
| 4,065,071 | 12/1977 | Holmberg | 242/107.4 B |
| 4,148,446 | 4/1979 | Sugar | 242/107.4 B |
| 4,168,810 | 9/1979 | Sack et al. | 242/107.4 BX |
| 4,429,841 | 2/1984 | Kassai | 242/107.4 B |
| 4,460,115 | 12/1985 | Toyama et al. | 242/107.4 B X |

FOREIGN PATENT DOCUMENTS 0092407  10/1983  European Pat. Off. .

Primary Examiner—John M. Jillions

[57] ABSTRACT

In improvement in locking pawl activating for a safety belt retractor mechanism of the type having a webbing storage spool, a locking ratchet wheel associated with the spool and a locking pawl for engaging the locking ratchet wheel is described wherein a programming pawl, which is mounted for movement from a nonactivated position to an activated position with regard to a surrounding lock cup which is adapted to operate the main locking pawl, is spring bias to a nonactivated position by a straight wire spring which is mounted by a looped end thereof to a pin protruding from an end of the spool to orbit therewith. Rotation of the spool causes rotation of the programming pawl which is pivotally mounted thereto in association with the spring and has a camming pin to camming surface engagement with an otherwise freely rotatable inertial mass which cams the programming pawl to its activated position when the acceleration of the spool causes the mass to lag spool rotation overcoming the bias of the aforementioned spring on the programming pawl.

2 Claims, 4 Drawing Sheets

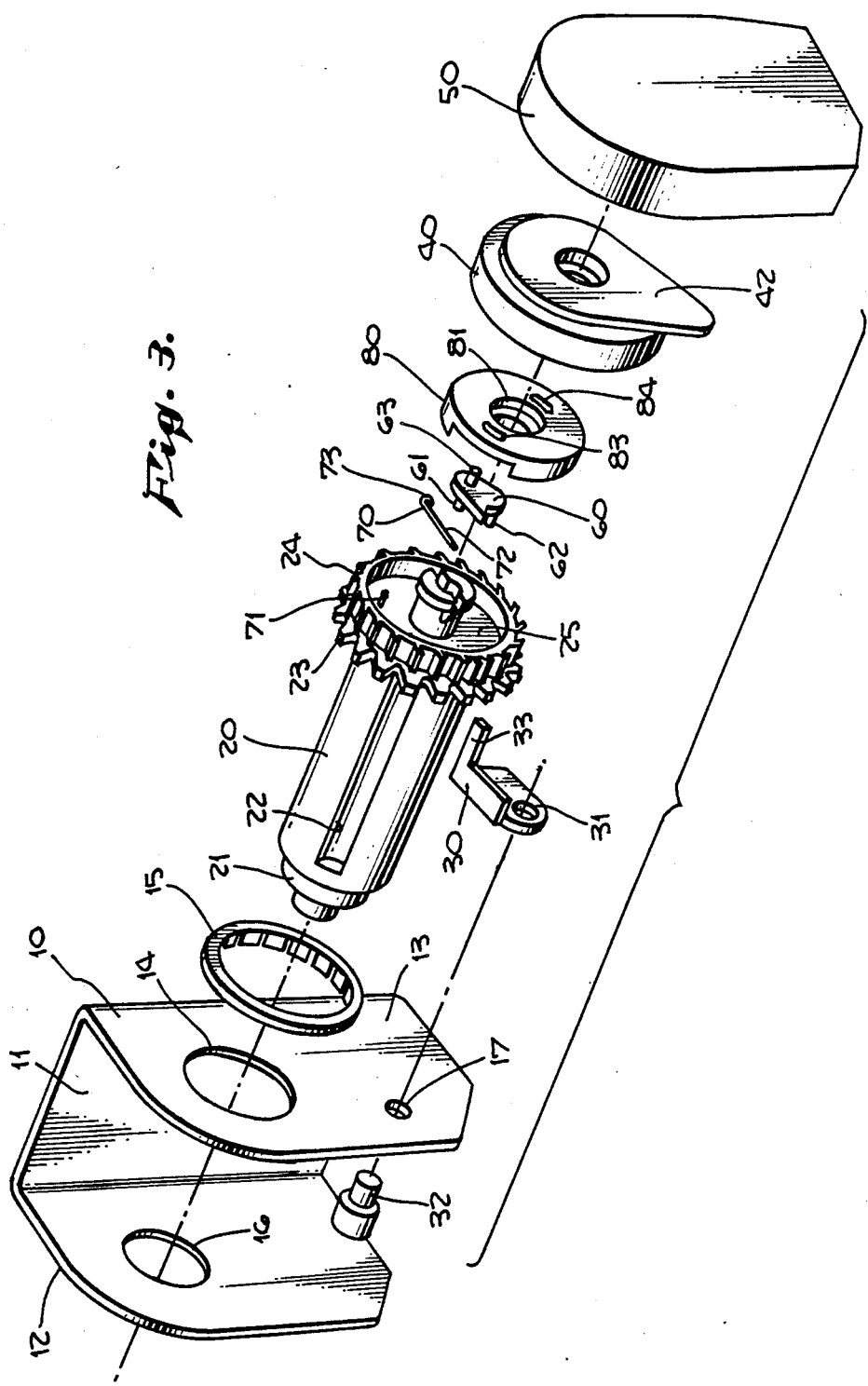

WEBBING SENSOR

BACKGROUND OF THE INVENTION

The present invention relates in general to means for locking safety belt retraction mechanism of the type wherein a strap acceleration responsive means senses strap acceleration of more than a predetermined amount to cause lock up of the safety belt webbing storage against further belt protraction. More particularly, the present invention relates to an improvement in the means for activated the locking pawl in response to the strap acceleration sensor means including the provision of an improved construction, mode of operation and method of assembly of the programming pawl, pawl biasing spring and inertial mass relative the associated components of the safety belt retraction mechanism.

Safety belt retraction mechanisms are currently in wide use for restraining vehicle passengers in their seats during emergency conditions. Such mechanisms typically sense an emergency condition by sensing changes in inertia of the vehicle, or changes in the movement of the safety belt positioned about the passenger. In the latter type retraction mechanism, acceleration of the safety belt of more than a predetermined amount causes lockup of the safety belt retraction mechanism. In such belt sensitive retraction devices, the sensitivity of the acceleration sensing means is usually controlled by the provision of a calibrated spring which normally biases a component of the mechanism to a nonactivated position. Spool acceleration of more than a predetermined amount, causes the inertial mass to lag spool rotation and overcome the spring bias to cause the mechanism to lock up the retractor device. Exemplary of such a safety belt retractor is that of the European patent application publication No. 0,092,407 published Oct. 26, 1983, entitled "EMERGENCY LOCKING VEHICLE SEAT BELT RETRACTOR". The retractor of this publication, generally known in the art as a European type retractor, has a safety belt storage spool which can be locked against protraction through the operation of either a vehicle inertia sensor or strap acceleration sensor associated with the spool. In the spool of this prior retractor mechanism, the inertia mass is biased by an associated spring to a nonactivated position. Other devices have employed springs of various configuration for biasing various components of the mechanism which must be overcome to cause lockup of the device.

It is been found to be difficult to control and maintain the required level of calibration during manufacture for the springs employed in these types of devices. The assembly of the generally fine spring elements also has proven difficult from a retractor assembly standpoint and is critical to the sensor operation. It has been noted that it would be desirable to have a spring design such that it would be easy to assemble into the retractor mechanism, cooperate with the associated components in a repeatable and reliable manner and have a configuration which facilitates its construction, mode of operation and assembly. The same is true for the associated elements which comprise the inertia mass and the programming pawl which is provided to act in response to relative rotation between the inertial mass and spool to cause the programming pawl to engage an associated lock cup to operate a main locking pawl of the retraction mechanism.

SUMMARY OF THE INVENTION

It is therefore the primary objection of the present invention to provide an improvement in the locking pawl activating means for a safety belt retraction mechanism whereby the ease of manufacture, reliability of mode operation and ease of assembly of the inertia mass, programming pawl, biasing spring and cooperating components of the apparatus are enhanced and accomplished.

It is a further object to provide an arrangement of such components so as to take advantage of the ease of manufacture, calibration and operation of a straight spring body in association with the programming pawl and inertia mass component in a strap acceleration responsive spool locking mechanism.

Generally stated, the present invention contemplates the provision of an improvement in the locking pawl activating means, for a strap acceleration responsive locking means, for a safety belt retraction mechanism of the type having a webbing storage spool, a locking ratchet wheel associated with the spool and a locking pawl for engaging the locking ratchet when moved into engagement therewith.

The locking pawl activating means includes the provision of a programming pawl which is pivotally mounted to the spool and biased by a spring means, also mounted to the spool and having a straight spring body portion entrained to the pawl, with an inertial mass of disc like configuration rotatable mounted relative to the spool and in a camming relation with the pawl whereby strap acceleration imparted to the spool which causes the mass to tend to lag the spool of a predetermined amount will cam the pawl, overcoming the pawl bias of the associated spring, to cause the pawl to move to an activated position wherein it will engage internal ratchet teeth of a surrounding lock cup which in turns operates the main locking pawl into engagement with the main locking ratchet wheel of the spool.

More specifically, the present invention contemplates the provision of a spring mounting means including a post protruding laterally of a disc like member associated with and rotatable with the spool whereby the post orbits about the spool center rotation to orbit the spring therewith, a spring entraining means associated with the pawl including two laterally protruding posts which, with the spring mounting post, provide three points of contact to entrain the spring therebetween in a straight linear configuration for the spring. The spring thus normally operates in a nondeflected, relaxed state in its mode of operation when the pawl is in an nonactivated position, and operates in view of its calibration, which can be predetermined by known means, to prevent movement of the pawl to its operating position until the strap acceleration exceeds an amount predetermined by the spring calibration.

The ease of assembly of these components is facilitated through the provision of a simple looped end of the spring which slip fits over the spring mounting pin on the spool end, through the provision of the spaced laterally protruding pins on the programming pawl which simply slip fit over the straight body portions of the spring with a mounting pin of the pawl loosely fitted into a mounting aperture in the end wall of the spool; through the provision of a disc like mass which is simply slip fit onto a spool stub shaft with a pivoted slot engagement with the pawl in addition to a camming surface to pin engagement therewith; and through the provision of an internal journal sleeve portion protruding generally axially of the lock cup which is slip fit within an aperture of the inertia mass disc and over a compressible head end of the stub shaft to hold the components, which have been simply stacked one upon the other, in a fully operational assembled relationship.

A more complete understanding of the present invention in an improvement in locking pawl activating means will become apparent to those skilled in the art as well as a recognition of additional advantages and objects will be afforded to those skilled in the art by a consideration of the following detailed explanation of an exemplary embodiment thereof. Reference will be made to the appended sheets of the drawings which will be first described briefly.

BRIEF DESCRIPTION OF THE DRAWINGS

FIG. 3 is an exploded view of the exemplary safety belt retraction mechanism of FIGS. 1 and 2 illustrating the present improvement in the locking pawl activating means in accordance with the present invention.

DETAILED DESCRIPTION OF THE PREFERRED EXEMPLARY EMBODIMENT

Figure 2:
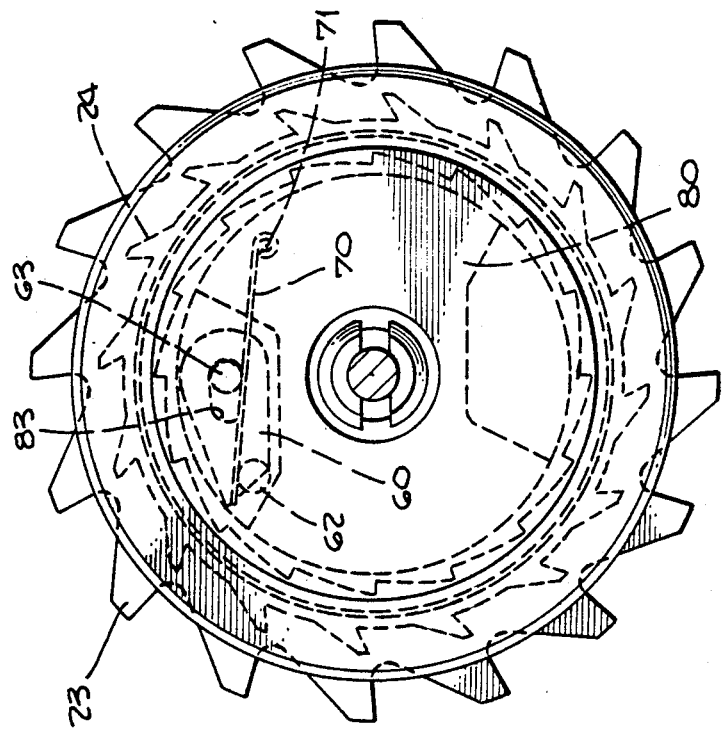
FIG. 2 is a front view of the mechanism of FIG. 1, partially in section, taken therein in the plane II—II.
Figure 1:
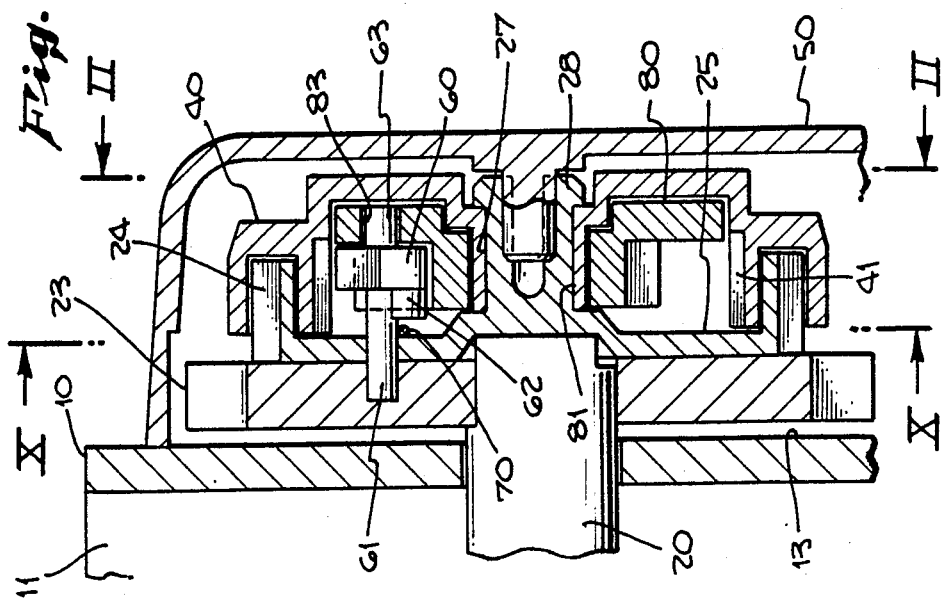
FIG. 1 is a vertical section view through a midportion of an exemplary embodiment of safety belt retraction mechanism, particularly the portion of the retractor having to do with the locking pawl activating means in accordance with the present invention.
Figure 4:
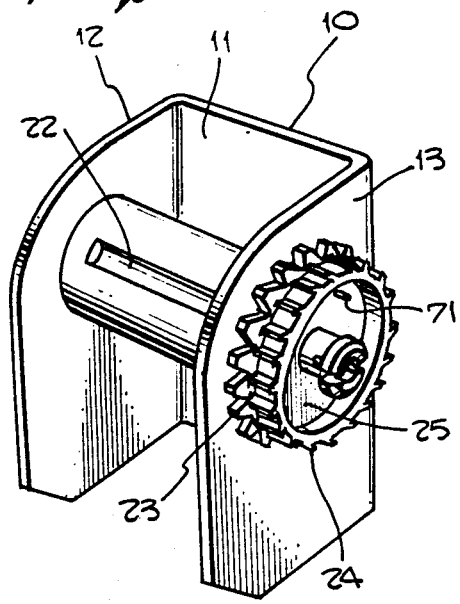
FIG. 4 is a perspective view of portions of the exemplary retraction mechanism during assembly of the locking pawl activating means before provision of subsequently assembled components.

Referring initially to FIGS. 1 through 3, the preferred exemplary embodiment in improvement in a locking pawl activating means for a safety belt retraction mechanism, in accordance with the present invention, is illustrated in association with an otherwise standard retraction mechanism and webbing spool rewind or storage means. Such retraction mechanisms are well known in the art as illustrated in European Patent Application Publication No. 0,092,407 entitled "EMERGENCY LOCKING VEHICLE SEAT BELT RETRACTOR", the disclosure of which is incorporated herein by reference. As seen in the appended drawings, the exemplary retractor includes a U-shaped frame 10 having a base 11 and side walls 12 and 13. The retractor spool 20 is simply slip fit through the aperture 14 in sidewall 13 and is secured therein via bushing 15. An integral journal portion 21 of the spool fits in the mounting aperture 16 of sidewall 12 in known manner to mount the spool for rotation on the base. Safety belt webbing, not illustrated, may be assembled in known manner to the spool via the webbing slot 22 after the spool has been assembled to base 11.

As is also well known in the art, spool 20 is provided with a locking ratchet 23 which is positioned on an outer side of sidewall 13 of the base. As is also well known in the art, a locking pawl 30 may be mounted via its journal aperture 31 to a mounting pin 32 which in turn is mounted to the base sidewall 13 by base wall aperture 17. The lock cup 40, which is of otherwise conventional form, has an internal ratchet 41 and an extension portion 42 which interacts with the arm 33 on the main locking pawl to cause pawl 30 to lock up with the spool locking ratchet 23 when the lock cup is rotated in a clockwise direction in FIG. 3. A typical cover 50 is also provided to cover the mechanism when fully assembled to the retractor frame 10 as described hereinafter.

The improvement in locking pawl activating means of the present invention is illustrated in association with a belt acceleration sensor mechanism as described hereinafter. It should be understood by those skilled in the art that retractor mechanisms of the type illustrated herein may also be activated by a vehicle inertia sensor mechanism as known in the art. Such vehicle inertia sensor means, employing an tiltable mass, may be mounted on the lock cup 40 in known manner and be provided so as to engage with the ratchet wheel 24 on the spool to cause the lock cup to rotate in a clockwise direction in response to changes in vehicle inertia, of more than a predetermined amount, as may occur in an emergency condition encountered by the vehicle.

The safety belt retraction mechanism as thus far described is of generally standard construction as presently known in the art. Webbing may be stored upon the spool 20 and locked against further protraction after having been placed in a position of use through engagement of the main locking pawl 30 with the spool locking ratchet 23 when the former is activated by the locking pawl activating means of the present invention which will now be described in detail.

As is particularly contemplated within the present invention, the locking pawl activating means includes the provision of programming pawl means 60, a programming pawl biasing spring means 70 and an inertial mass 80 whose construction and mode of operation with one another and the associated spool and locking means is improved in its manufacturing, ease of operation and assembly characteristics. A spring mounting means is associated with the spool for mounting the spring 70 to orbit with rotation of the spool. In the exemplary embodiment, such spring mounting means comprises the provision of the post, as seen in FIGS. 2, 3, 4–6, 10 and 11 on the disc shaped web 25 of the ratchet wheel 24. As seen in FIG. 1, the ratchet wheel 24 and its web 25 are fixedly secured to the spool 20 in known manner to revolve therewith. In view thereof, spring mounting pin 71 is provided to rotate with the spool in a manner whereby it orbits about the center rotation for the spool.

Figure 5:
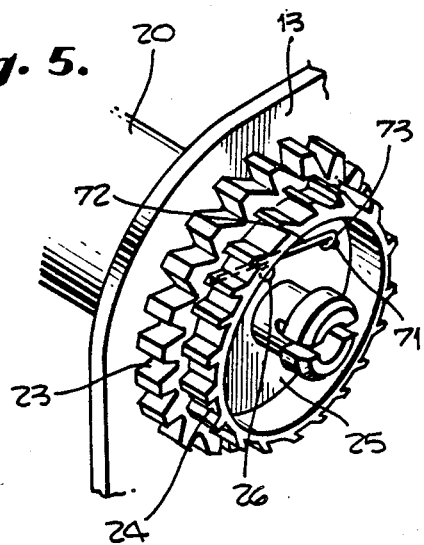
FIG. 5 is a view as in FIG. 4 showing the exemplary spring means mounted thereto.

As is also contemplated within the present invention, the calibrated spring means for biasing the programming pawl 60, in accordance with present invention, is provided in the form of a simple straight spring body 72 having a looped end 73 as seen in FIGS. 3, 5, 6, 10 and 11. The straight wire spring construction facilitates the manufacturing and calibration of the spring and the looped end 73 facilitates the simple assembly step of merely slip fitting the looped end 33 of the spring over the post as seen in FIG. 5.

Figure 6:
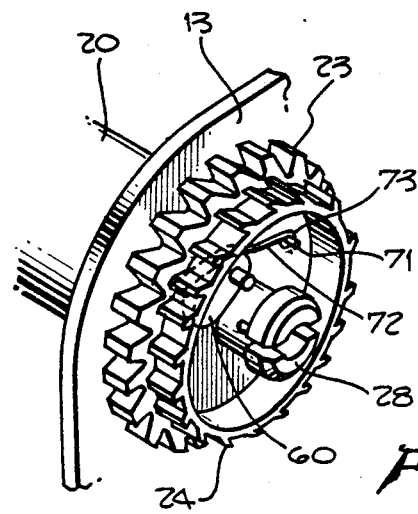
FIG. 6 is a view as in FIGS. 4 and 5 showing a programming pawl in accordance with the present invention mounted in relation to the spring means.

Programming pawl means are provided in accordance with the present invention for operating the lock cup 40 in a clockwise direction to cause lock up of the main locking pawl 30 and ratchet wheel 23 in response to spool acceleration, the programming pawl of the present invention having spring entraining means associated with it for entraining the spring 70 mounted to the spring post 71. As seen in FIG. 1, the exemplary programming pawl 60 has a mounting post 61 which protrudes through appropriate apertures in ratchet wheels 24 and 23 to pivotally mount the pawl 60 to the ratchet wheels 23 and 24 so as to rotate therewith in response to spool rotation. As seen in FIGS. 5 and 6, the pawl 60 may be simply assembled to the aperture 26, as seen in FIG. 5, in the web 25 of ratchet wheel 24 by simply slip fitting the pawl post 61 therein to assemble the pawl to the mechanism as seen in FIG. 6. In doing so, and as contemplated within the present invention, the spring body 72 is entrained to the programming pawl 60 as will now be explained.

Figure 10:
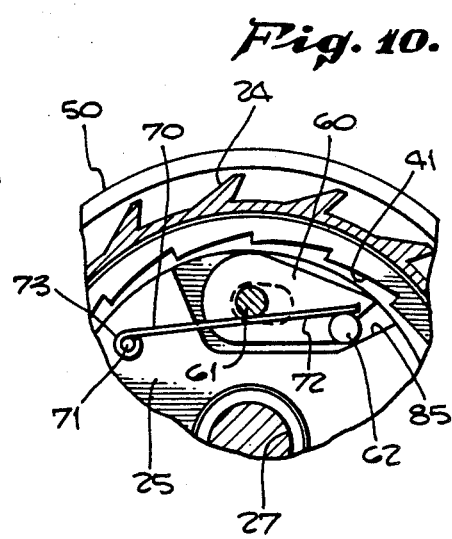
FIG. 10 is a detailed view of the mechanism of FIG. 1 taken therein along the plane X—X showing the programming pawl in a non-activated position.
Figure 9:
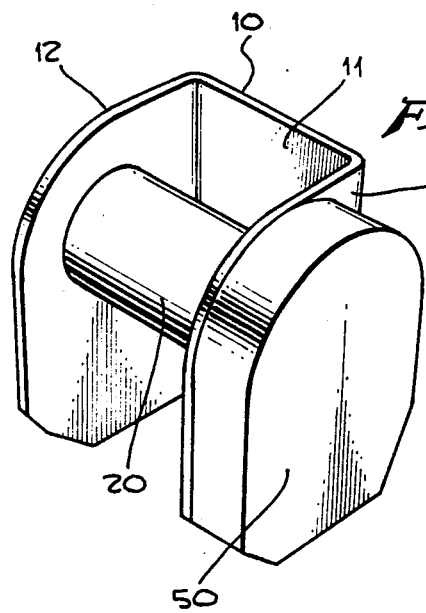
FIG. 9 is a view as in FIGS. 4 through 8 showing a housing covering the locking pawl activating means.
Figure 11:
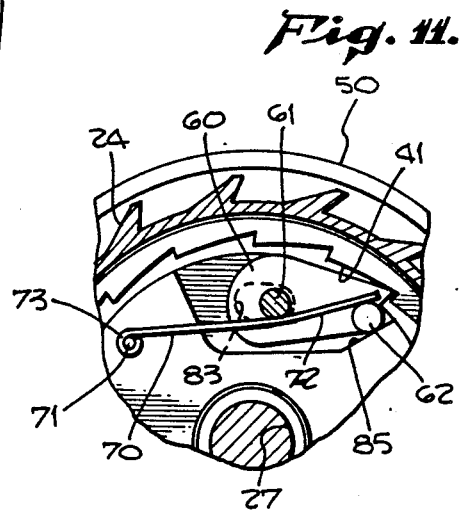
FIG. 11 is a view as in FIG. 10 showing the programming pawl in an activated position engaging internal teeth of the lock cup to cause lock up of the main pawl.

Spring entraining means are associated with the programming pawl 60, in accordance with the present invention, for entraining the spring body 70 to the pawl to bias the pawl to a nonactivated position as seen in FIG. 10. Such entraining means in exemplary embodiment includes the provision of the pawl post 61 and the additional cam pin 62 which is best seen in FIGS. 3, 10 and 11. In addition to functioning as a cam follower in association with the inertial mass 80 as described hereinafter, pin 62 cooperates with its laterally spaced companion pin 61, the two pins protruding laterally from pawl 60 in direction inwardly of the mechanism, so as to entrain the straight body 72 of spring 70 when the pawl is in the nonactivated position of FIG. 10. As best seen in FIG. 10, the body 72 of straight spring means 70 runs from the spring mounting post 71, under the pawl mountinq pin 61 and over the pawl camming pin 62 in a non-deflected, substantially straight line manner. Pawl 60 is thus biased by the calibrated spring 70 to its nonactivated position when the spring is in a predetermined non-flexed condition which facilitates its operation in a predetermined manner for its calibration.

Figure 7:
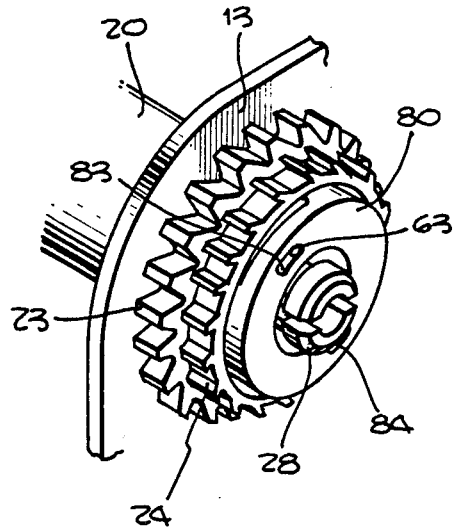
FIG. 7 is a view as in FIGS. 4, 5 and 6 showing an exemplary inertial mass in a shape of a disc mounted for rotation on a spool stub shaft and in engagement through a lost motion connection with the programming pawl.
Figure 8:
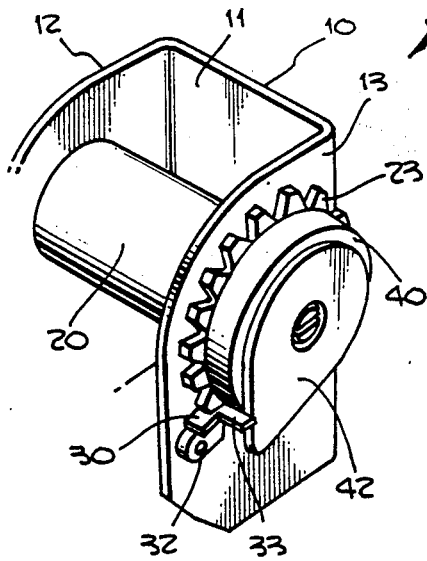
FIG. 8 is a view as in FIGS. 4 through 7 showing the lock cup assembled to the locking pawl activating means ready to operate the main locking pawl.

After assembly of the exemplary programming pawl 60 to the mechanism as seen in FIG. 6, the inertial means 80 is assembled by simply a loose slip fit over the spool stub shaft 27 which has a bifurcated enlarged end ring 28 which receives the lock cup 40 in a snap fit relationship in a subsequent assembly step. As seen in FIGS. 1, 3 and 7, the inertial mass 80 is provided with an internal bore 81 sized to fit over the end ring 28 of stub shaft 27 and has a pair of slots 83 and 84 provided symmetrically thereof so that either one can slip fit over the stabilizing pin 63 of pawl 60 in a lost motion connection therebetween. The interaction of pin 63 and slot 83 of the pawl and inertia mass facilitates the smooth pivotal movement of the pawl under the camming action of the mass which is provided by the cam surface 85 as seen in FIGS. 10 and 11. Relative rotation between inertia mass 80 and spool 20, against the bias of spring 70 acting upon the pawl 60, causes movement of the pawl 60 via the camming action of surface 85 against cam pin 62 to the activated position of FIG. 11. Such relative rotation will occur, as is known in the art, when an emergency condition causes an acceleration of the safety belt wound upon spool 20 of such a magnitude that the bias of spring 70, calibrated to respond to a predetermined acceleration condition, to be overcome. After assembly of the inertial mass 80, as seen in FIG. 7, the lock cup 40 may be snap fit on to the spool stub shaft 27 as best seen in FIGS. 1 and 8. As particularly seen in FIG. 1, the lock cup 40 has an inner sleeve journal portion 41 which fits the outer diameter of shaft 27 inwardly of the compressible bifurcated head 28. This journal sleeve member 41 of the lock cup 40 supports the inertial mass 80 for free rotation thereon, subject to the tendency for the mass to follow spool rotation by virtue of the connection to the spool via the camming engagement between mass surface 85 and pawl pin 62, the pawl's pins engagement with spring 72 which is trapped by mounting pin 71 beneath the spool mounted pin 61, relative motion between the mass and the spool causing a deflection of the spring body 72 beneath pin 61 as seen in FIG. 11.

Having thus described a preferred construction, mode of operation and method of assembly of the improvement in locking pawl activating means in accordance with the present invention, it should be now apparent to those skilled in the art that the various advantages and objects aforestated have been attained by the within preferred exemplary embodiment. Various modifications, adaptations and variations thereof may be made within the scope of the present invention which is defined by the following claims.

I claim:

1. A method for the easy assembly of an inertial pawl, inertial mass and pawl biasing means of a seat belt retraction mechanism comprising the steps of:
    mounting a straight wire spring by a looped portion on a post protruding laterally from a spool associated member, positioning a programming pawl having first and second entraining members laterally protruding therefrom on one side and an inertial mass engaging pin laterally protruding from an opposite side, adjacent said spool associated member, with said straight wire spring entrained by a slip fit between said first and second members and mounting an inertial mass of disc configuration on a spool stub shaft to rotate freely thereon; and
    engaging said inertial mass engaging pin in a lost motion connection to said programming pawl by a slip fit of a slot in a disc portion thereof, over said pin by said step of mounting said disc on said spool stub shaft.

2. The method of claim 1, wherein:
    said spring straight body portion is placed such that it passes under said first entraining member and over said second entraining member in a nondeflected manner.

* * * * *